(12) United States Patent
Roth et al.

(10) Patent No.: US 6,997,448 B2
(45) Date of Patent: Feb. 14, 2006

(54) DEVICE FOR THE DETACHABLE MOUNTING OF WORKPIECES ON MACHINING DEVICES

(75) Inventors: Walter Roth, Gallen (CH); Rudolf Kuratli, Niederwil (CH)

(73) Assignee: Mecatool AG, Flawil (CH)

( * ) Notice: Subject to any disclaimer, the term of this patent is extended or adjusted under 35 U.S.C. 154(b) by 123 days.

(21) Appl. No.: 10/296,999

(22) PCT Filed: Feb. 28, 2002

(86) PCT No.: PCT/EP02/02174

§ 371 (c)(1),
(2), (4) Date: May 22, 2003

(87) PCT Pub. No.: WO02/078898

PCT Pub. Date: Oct. 10, 2002

(65) Prior Publication Data

US 2004/0026843 A1 Feb. 12, 2004

(30) Foreign Application Priority Data

Apr. 2, 2001 (DE) ................................ 101 16 229

(51) Int. Cl.
*B23Q 3/00* (2006.01)
(52) U.S. Cl. ....................... 269/309; 269/310
(58) Field of Classification Search ........ 269/309–310, 269/32; 279/4.06, 4.12
See application file for complete search history.

(56) References Cited

U.S. PATENT DOCUMENTS

| 5,415,384 | A | | 5/1995 | Obrist et al. |
| 5,961,261 | A | | 10/1999 | Stark |
| 6,073,325 | A | * | 6/2000 | Stark ........................ 29/33 P |
| 6,170,836 | B1 | * | 1/2001 | Etter ....................... 279/4.06 |
| 6,283,465 | B1 | * | 9/2001 | Etter ........................ 269/309 |
| 6,532,861 | B2 | * | 3/2003 | Etter ........................... 92/86 |
| 6,604,738 | B2 | * | 8/2003 | Haruna ..................... 269/309 |

FOREIGN PATENT DOCUMENTS

| DE | 197 05 685 | 3/1998 |
| DE | 198 26 328 | 11/1999 |
| DE | 198 41 928 | 3/2000 |
| DE | 200 21 047 | 3/2001 |
| EP | 0 922 529 | 6/1999 |
| EP | 0 936 025 | 8/1999 |
| EP | 1 044 760 | 10/2000 |

* cited by examiner

*Primary Examiner*—Lee D. Wilson
(74) *Attorney, Agent, or Firm*—Bachman & LaPointe, P.C.

(57) ABSTRACT

A device for holding workpieces in a releasable manner is proposed, comprising a mounting plate (2) with a clamping pin (3) for mounting a workpiece and an end plate (5) for connecting in a supporting manner to a machining apparatus for machining the workpiece, a hydraulically or pneumatically movable piston (11), a ball sleeve (15) with balls (16), which are arranged in such a way that they can be moved with respect to the clamping pin into the ball sleeve by the piston, and at least one spring (19) acting against the clamping force being provided between the mounting plate and the end plate as means which transmit the clamping force, and the mounting plate (2) having a centring region (21) which interacts with the clamping pin (3) and is designed in one piece and in an annular-disc shape.

8 Claims, 5 Drawing Sheets

DEVICE FOR THE DETACHABLE MOUNTING OF WORKPIECES ON MACHINING DEVICES

BACKGROUND OF THE INVENTION

The invention relates to a device for holding workpieces or pallets for workpieces in a releasable manner on a machining apparatus, comprising a mounting plate which can be connected to the machining apparatus for machining the workpiece, and a clamping pin which can be connected to the pallet or to the workpiece and can be held in the mounting plate in a releasable manner, at least one spring for producing a clamping force for fastening the clamping pin to the mounting plate being provided, and a piston which can be moved hydraulically or pneumatically against the clamping force being provided, and a ball sleeve having balls which can be moved into the ball sleeve by the piston and are arranged so as to interact with the clamping pin in such a way that the clamping pin can be released against the clamping force.

During the machining of workpieces, for example of moulds for die-casting and injection-moulding machines, stringent requirements are imposed on the accuracy of the dimensions. Even after passing through several machining steps, the dimensions of the mould parts may deviate from the specifications essentially by only a few thousands of a millimetre. Modern machine tools permit this precision, inter alia thanks to computer-controlled machining. However, precise machining requires, on the workpiece, precise determination and reproducibility of the zero point of the x-y-z coordinate system for the computer control. The dimensional accuracy of the workpiece depends to a great extent on the accuracy of the clamping devices which are used in order to hold the workpieces in position in a reproducible and releasable manner during the various machining steps.

EP 922529-A1 discloses a unit of the generic type for connecting parts of a palleting system in a releasable manner. The system essentially comprises coupling elements which can be secured to one another in a releasable manner, the first coupling element being arranged in a locating plate for pallets, and it being possible for the second coupling element to be centred and connected in a resilient manner to the first coupling element. A disc-shaped piston, movable by means of hydraulics, springs and a bolt are provided in order to produce the coupling force, the bolt, in one section, forming a ball track together with the second coupling element. For the centring, the first coupling element has at least three spring parts which project along a circular line around the coupling axis and are brought into engagement with the second coupling element.

Starting from this prior art, the object of the invention is to specify a device for holding workpieces in a releasable manner which is composed of few, relatively small individual parts, as small a region as possible being taken up on the workpiece for the releasable fastening.

SUMMARY OF THE INVENTION

The foregoing object is achieved by a device for holding workpieces or pallets for workpieces in a releasable manner on a machining apparatus, comprising a mounting plate which can be connected to the machining apparatus for machining the workpiece, and a clamping pin which can be connected to the pallet or to the workpiece and can be held in the mounting plate in a releasable manner, at least one spring for producing a clamping force for fastening the clamping pin to the mounting plate being provided, and a piston which can be moved hydraulically or pneumatically against the clamping force being provided, and a ball sleeve having balls which can be moved into the ball sleeve by the piston and are arranged so as to interact with the clamping pin in such a way that the clamping pin can be released against the clamping force, and a centring region which interacts with the clamping pin and is designed in one piece and in an annular-disc shape being formed on the mounting plate.

In accordance with the invention, it is advantageous that the clamping pin and the workpiece connected to it or the pallet can be clamped in position and centred virtually free of backlash. This is achieved in that the mounting plate, in the centring region, and the clamping pin have clamping surfaces which interact with one another for the centring, run parallel to one another and are each designed as lateral surfaces of a frustum of a cone, the cone apex of which lies inside the device.

It is also advantageous that relatively heavy workpieces can also be positioned with the greatest precision and held in place in a releasable manner with a relatively small expenditure of force. This is achieved in that, in the relieved state, the tapering clamping surface in the centring region of the mounting plate is arranged closer, within the micron range, to the z-axis of the device than the tapering clamping surface on the clamping pin. A more compact type of construction of the palleting system also becomes possible.

It is also advantageous that the clamping surfaces can be cleared of contaminants in an easy and especially effective manner. This is achieved in that the tapering clamping surfaces arranged so as to interact with one another form, in the relieved state, an annular passage for a cleaning or flushing medium.

It is also advantageous that the device makes it possible to check for the presence of the workpiece in an integrated manner. This is achieved in that the mounting plate has at least two z-workrest regions of different design with feed openings for the flushing or cleaning medium in such a way that the z-workrest regions are cleaned by the flow of the flushing or cleaning medium during the clamping operation, and it being possible, on account of the flow of the flushing or cleaning medium, to carry out a check for the presence of a workpiece adjacent to the z-workrest regions of the device.

It is also advantageous that the expenditure of force for clamping the clamping pin can be kept as small as possible and that the clamping force can be transmitted as effectively as possible from the piston to the clamping pin. This is achieved in that, to radially move the balls between the piston and the clamping pin, control flanks are formed on the piston and on the clamping pin, these control flanks having a different angle of inclination with respect to the clamping axis z in such a way that a reduction ratio of the movement of at least 3 to 1 is achieved and in particular in such a way that the clamping pin can be mechanically locked with the mounting plate in such a way that, in the clamped state of the device, the clamping pin and the mounting plate can be released only by destruction.

BRIEF DESCRIPTION OF THE DRAWINGS

Exemplary embodiments of the invention are described with reference to the figures.

In the drawing.

DETAILED DESCRIPTION

Figure 1:
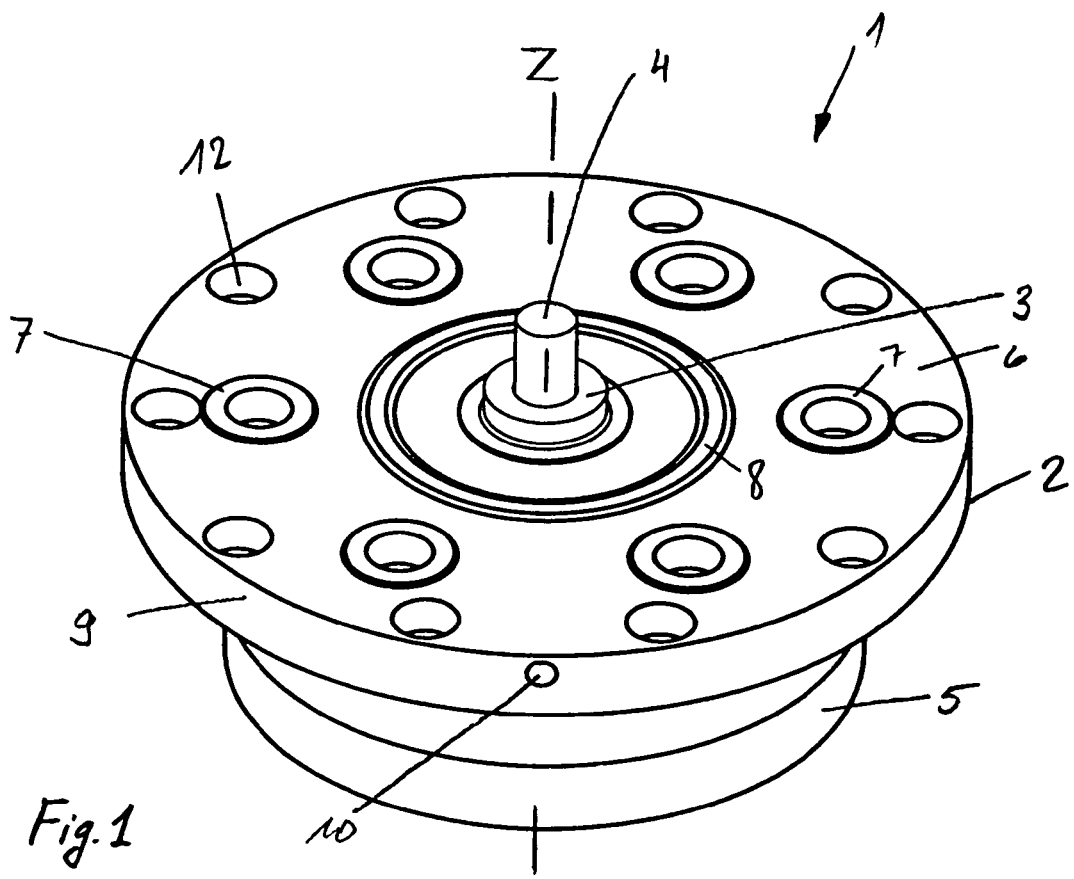
FIG. 1 shows a perspective view of a device according to the invention for holding workpieces in a releasable manner.

A device 1 for holding workpieces or pallets in a releasable manner is shown in FIG. 1 in a perspective view towards the top side. On the device 1, from top to bottom, a mounting plate 2, a clamping pin 3 with a screw 4 for the releasable fastening of the clamping pin to a workpiece (not shown here) or a pallet, and an end plate 5 can be seen in FIG. 1. The device 2. is fastened to or in a machining apparatus, for example a computer-controlled precision milling machine, and serves for the defined, repeatable fastening of a workpiece or a pallet which carries workpieces. The device 1 is constructed so as to be essentially circular and symmetrical about an axis z. The mounting plate 2 serves to mount in a defined position the workpiece or the pallet with workpieces which can be machined by means of a milling tool.

The top side 6 of the mounting plate 2 serves to accurately determine the position of the z-plane of the workpiece to be machined and, to this end, has a plurality of "z-workrest regions" 7, 8 distributed over the top side 6. As first z-workrest regions 7, a plurality of annular regions 7, "z-islands" 7, distributed on a circle can be seen. A further z-workrest region 8 is formed in an annular manner concentrically about the z-axis of the device 1. The accurate position and arrangement of the bearing regions 7, 8 is decisive as a reference surface in the z-direction of the workpiece. The end plate 5 serves firstly for closing off and fitting together with the mounting plate 2 to form the device 1 and secondly for connecting the device 1 to hydraulic or pneumatic media for operating and cleaning the device.

Furthermore, a first opening 10 can also be seen on a boundary surface 9 of the mounting plate 2 in FIG. 1, which opening 10 was necessary in production for producing a feed passage 20, which, however, was subsequently closed again. The flushing or cleaning medium is fed during the mounting to all the surfaces which are important for the accurate positioning of the workpiece to be machined. This ensures that the workpiece, during all the machining steps, is fastened in the same position with respect to the zero point of a x-y-z coordinate system without disturbing particles.

Figure 2:
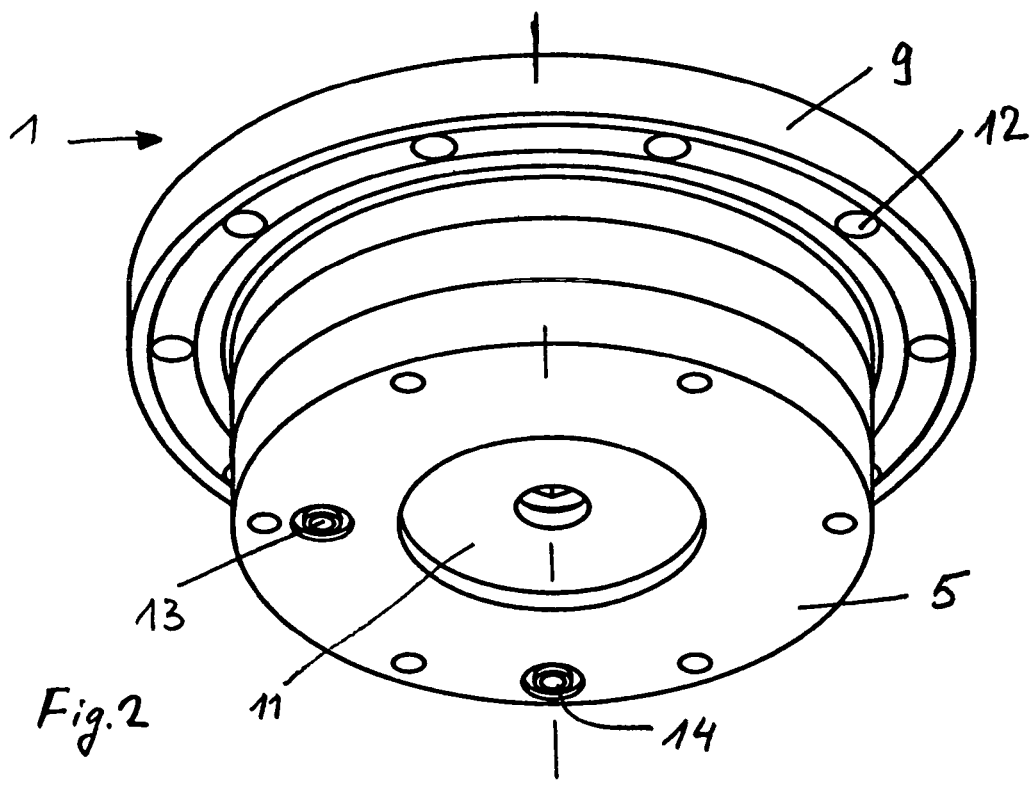
FIG. 2 shows a further perspective view of the device in FIG. 1, as viewed towards the opposite side.

The same device is again shown in perspective in FIG. 2. Furthermore, part of a piston 11 can be seen in the central region of the end plate 5. The piston 11 is arranged so as to be displaceable inside the device 1 in the direction of the z-axis by means of pneumatics or hydraulics. Also shown in FIG. 1 and FIG. 2 are holes 12, into which the matching screws can be inserted which serve to fasten the device 1 to a primary region of the machining apparatus, for example a machine table or machine bed. A feed opening 13 for the feeding of the hydraulic or pneumatic medium for the movement of the piston 11 and a further feed opening 14 for the feeding of the flushing or cleaning medium, for example flushing air at a pressure of less than 6 bar, to the z-islands 7 can also be seen on the underside of the end plate 5.

Figure 3:
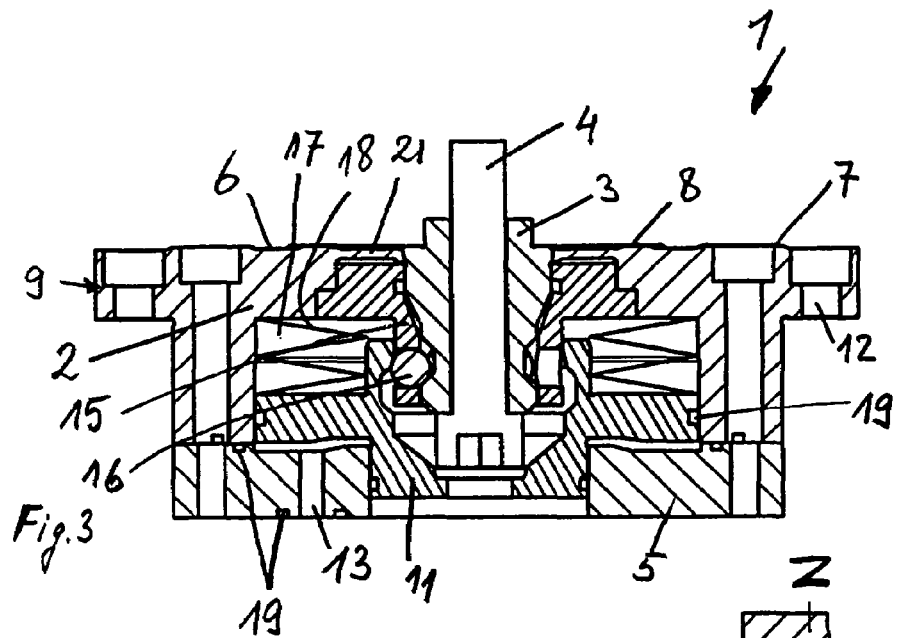
FIG. 3 shows a section through the device in FIG. 1.

The device in FIGS. 1 and 2 is shown sectioned in FIG. 3. The section in FIG. 3 has been taken on a centre line through the first feed opening 13. Furthermore, a ball sleeve 15, with a number of balls 16 arranged therein, and a bank 17 of springs 18, here designed as a bank of disc springs 18, are shown in the section in FIG. 3. Seals are provided at various points of the device 1 in order to seal off the device 1 from the hydraulic or pneumatic medium and also to seal it off from the flushing or cleaning medium. These seals have been omitted in the section in FIG. 3. However, individual receptacles 19 in which such seals can be accommodated can be seen in the section in FIG. 3.

Figure 4:
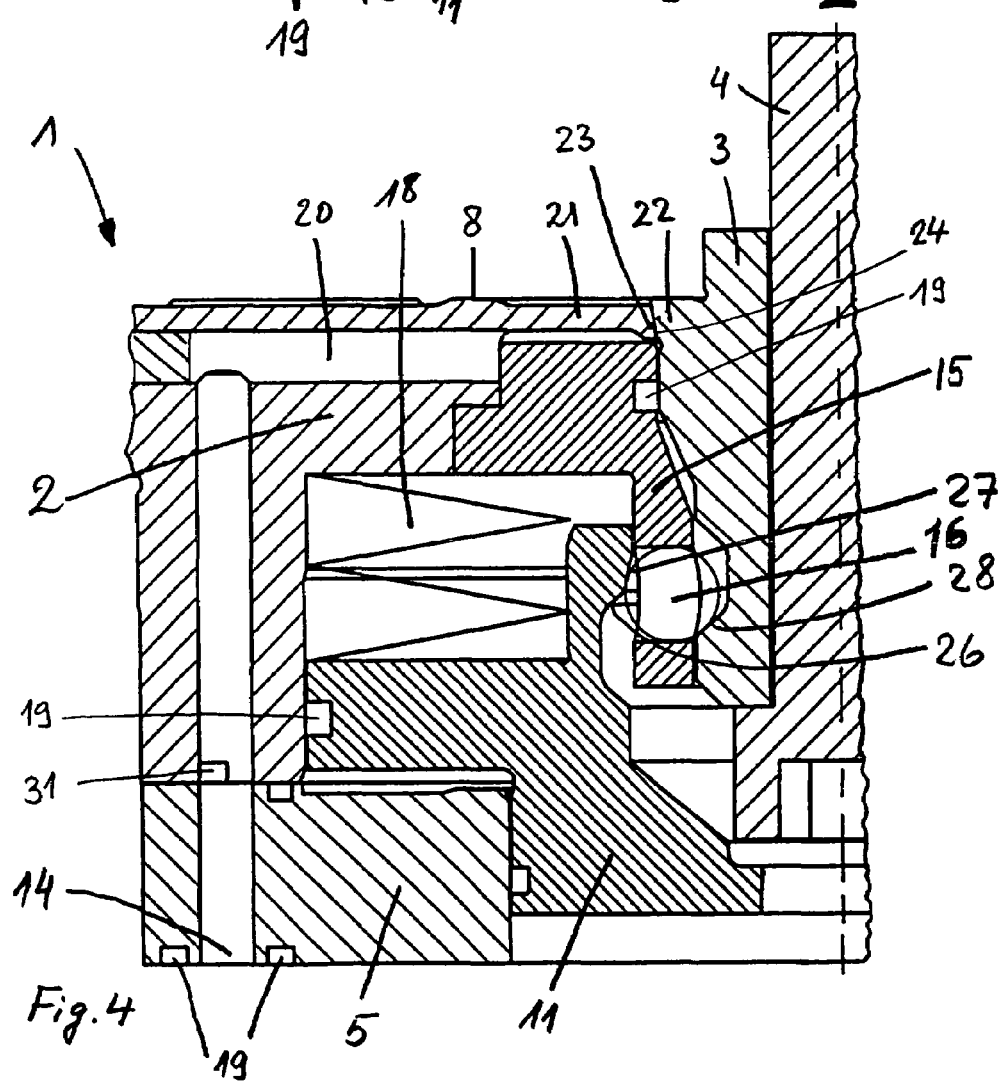
FIG. 4 shows a further, greatly enlarged section through the device in FIG. 1, taken at right angles compared with the section in FIG. 3.

A further section through only a region of the device 1 in FIG. 1 is shown greatly enlarged in FIG. 4. The section in FIG. 4 has been taken at a right angle to the section in FIG. 3. A passage 20 which serves to feed the flushing or cleaning medium to the central region of the device 1 can therefore also be seen in FIG. 4. In the section in FIG. 3 and in particular in the enlargement of FIG. 4, it can be seen how the mounting plate 2 has a centring region 21 designed in an annular disc shape. The centring region 21 is of continuous design, i.e. it covers a region of 360° about the z-axis of the device 1. The centring region 21 runs radially inwards from the mounting plate 2 and adjoins a region 22 of the clamping pin 3 of matching design.

Due to the relatively thin-walled, annular-disc-shaped design of the centring region 21 and due to the one-piece design together with the rest of the mounting plate 2, the centring region 21, with the free end 23, becomes resilient in such a way that the free end 23 can be moved downwards in the direction of the z-axis when the pin 3 is being clamped in position. The clamping surface 23 on the free end of the centring region 21 acts on the entire circumference together with a matching clamping surface 24 in the section 22 of the clamping pin 3. The first clamping surface 23 of the centring region 21 and the second clamping surface 24 of the clamping pin 3 are formed conically and so as to match one another exactly by a precision machining method. The cone angles of the centring region 21 and of the clamping pin 3 are identical; that is to say the clamping surface 23 on the free end of the centring region 21 and the clamping surface 24 in the section of the clamping pin 3 run in parallel. The clamping surfaces 23, 24 are designed like the lateral surfaces of a frustum of a cone, the cone apex lying inside the device 1. In this case, it should be noted that the first clamping surface 23 lies a few microns, less than one hundredth of a millimetre, closer to the z-axis of the device 1 than the second clamping surface 24.

The complementary design of the centring region 21 and of the clamping pin 3 achieves the effect that, during the clamping of the clamping pin 3, a radially acting force, a "prestress", is produced in the central region of the mounting plate 2, and this force acts on the entire circumference of the clamping pin 3, i.e. as uniformly as possible. When the clamping pin 3 is lifted, a passage, an annular gap, is formed between clamping pin and mounting plate, and this passage is closed again during lowering. The flushing medium flows through this annular gap at a relatively high flow velocity. The cross section of flow for the flushing and cleaning medium is therefore kept as small as possible. This results in the effectiveness of the cleaning becoming as high as possible. The effectiveness of the flushing medium is not reduced, since at no time are unnecessarily large cross sections of flow formed when the clamping pin 3 and mounting plate 2 are fitted together. The flushing air can therefore escape through this annular gap until the clamping operation has been completed. Flushing air may also be fed to the z-islands 7.

Figure 5:
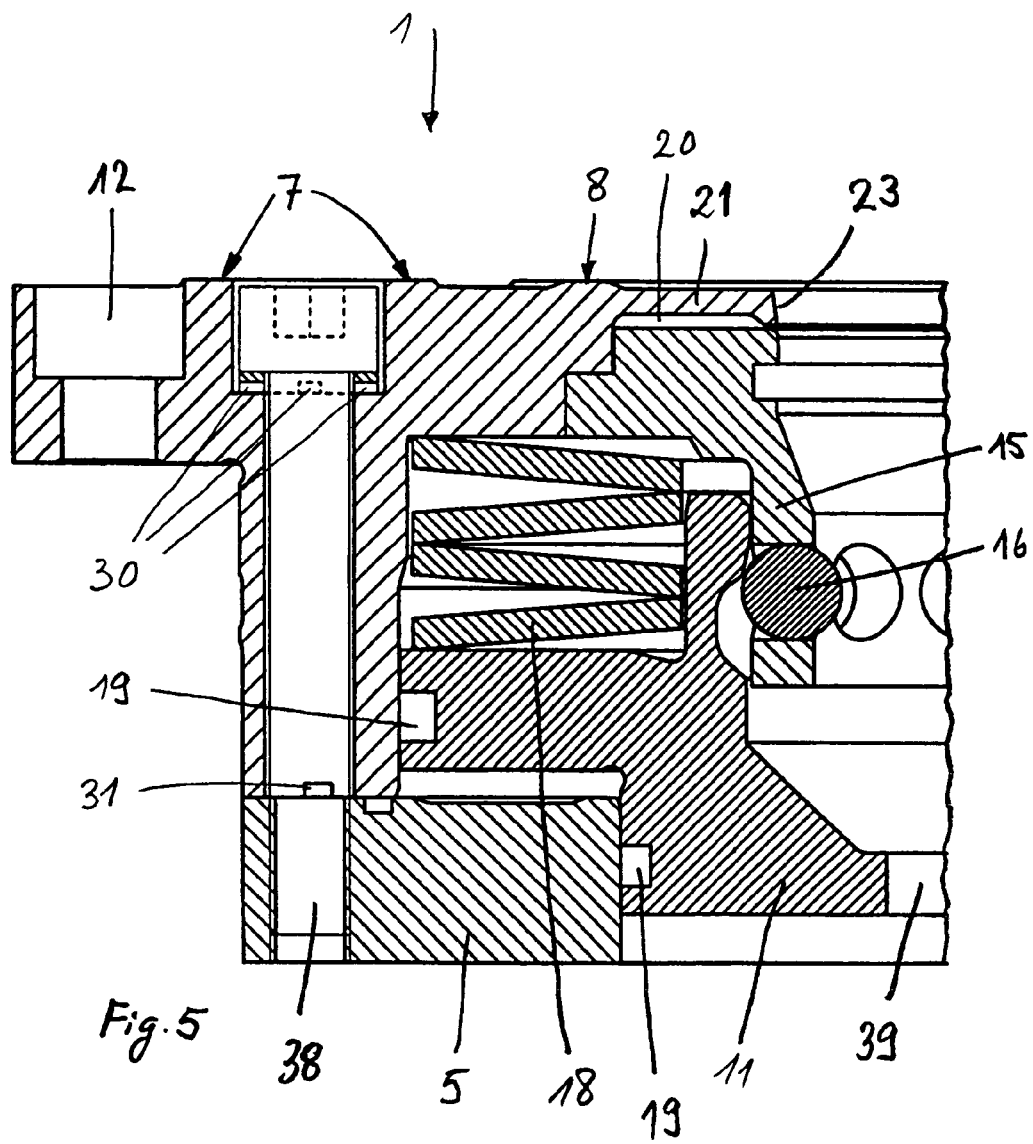
FIG. 5 shows a further, enlarged section through the device in FIG. 1.

Apertures 30 which permit the air feed to the region of the z-islands 7 and an annular passage 31 which serves to distribute the flushing air to the various z-islands 7 can be seen in FIG. 5. The z-islands 7 are cleaned in the same way as the annular concentric z-workrest region 8, which contributes to the further precisely defined positioning of the workpiece. One of the screws 38 which serve to fasten the end plate 5 to the mounting plate 2 is also shown in FIG. 5. In FIG. 5, the clamping pin 3 has been omitted in order to open the view towards the ball sleeve 15. The piston 11 has a central bore 39, which serves as a vent bore and through which the flushing or cleaning medium and the impurities carried along therein can escape.

The clamping pin 3 is held in place at further points of its circumference in a releasable manner in the device 1. In the operating state, that is to say when the workpiece is clamped in position, the force of the bank of disc springs 18 acts downwards on the piston 11. On its inside, i.e. on the inner circumference directed towards the clamping pin 3, the piston 11 has a profile 26, 27 which interacts with the balls 16 in the ball sleeve 15. The ball sleeve 15 serves to mount the balls 16, which are arranged in a circle around the clamping pin 3. In the region of the balls 16, the clamping pin 3 likewise has a precisely defined profile 28. The profiles serve as control flanks 26, 27, 28 for the balls 16 and are formed with different angles in such a way that, when the clamping pin 3 is released and clamped in position in the device 1, the clamping force is transmitted with a reduction ratio of, for example, at least 3 to 1. This achieves the effect that the clamping pin can be held with a relatively high force even with a relatively low clamping force of the piston 11. The force which acts in the clamped-on state on the clamping pin is so high that the pin 3 could be removed only after destroying the device.

Figure 6:
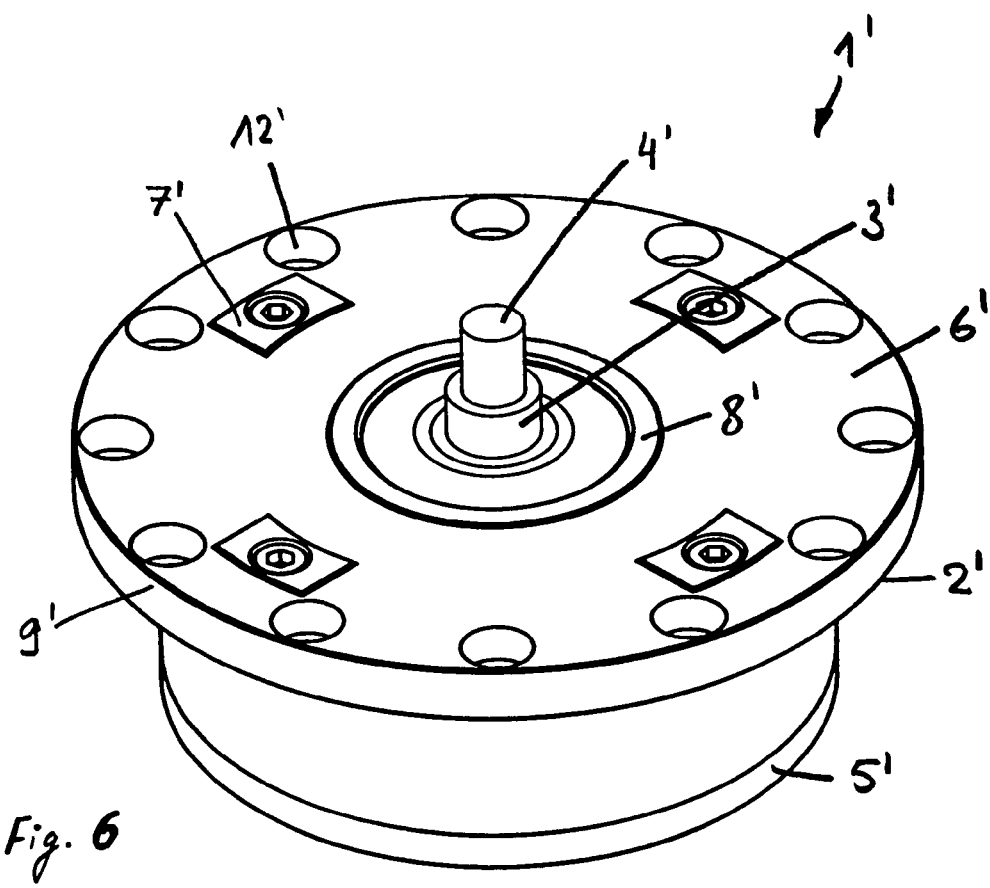
FIG. 6 shows a perspective view of a further device according to the invention for holding workpieces in a releasable manner.
Figure 7:
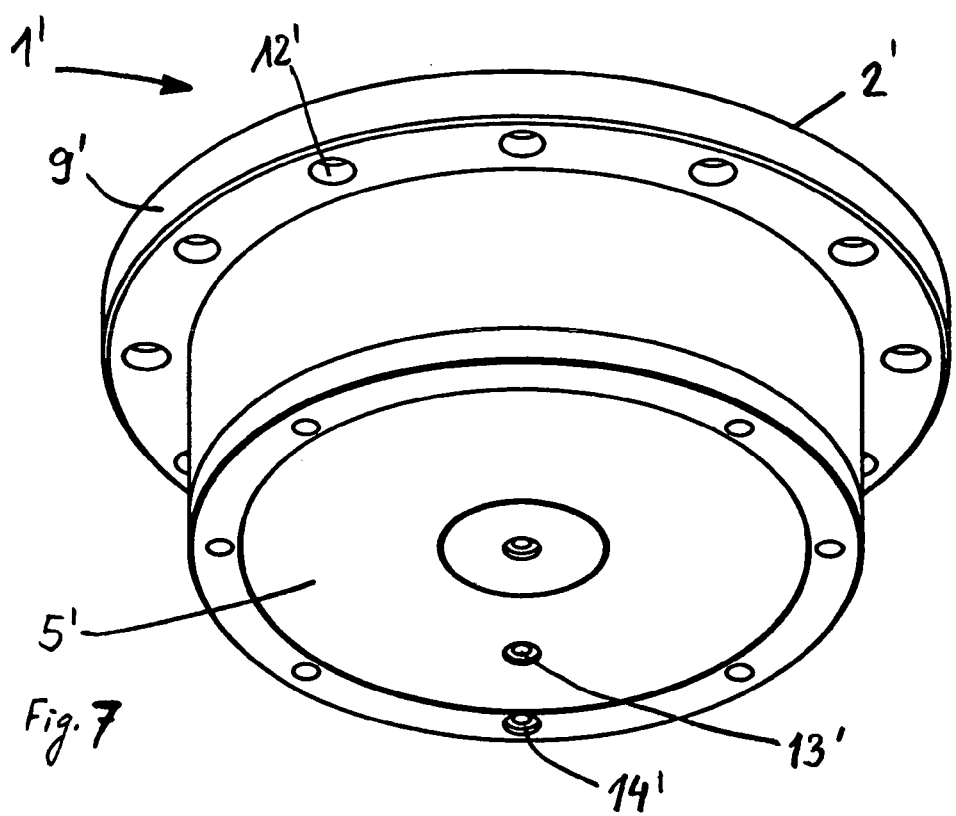
FIG. 7 shows a further perspective view of the device in FIG. 5, as viewed towards the opposite side.
Figure 8:
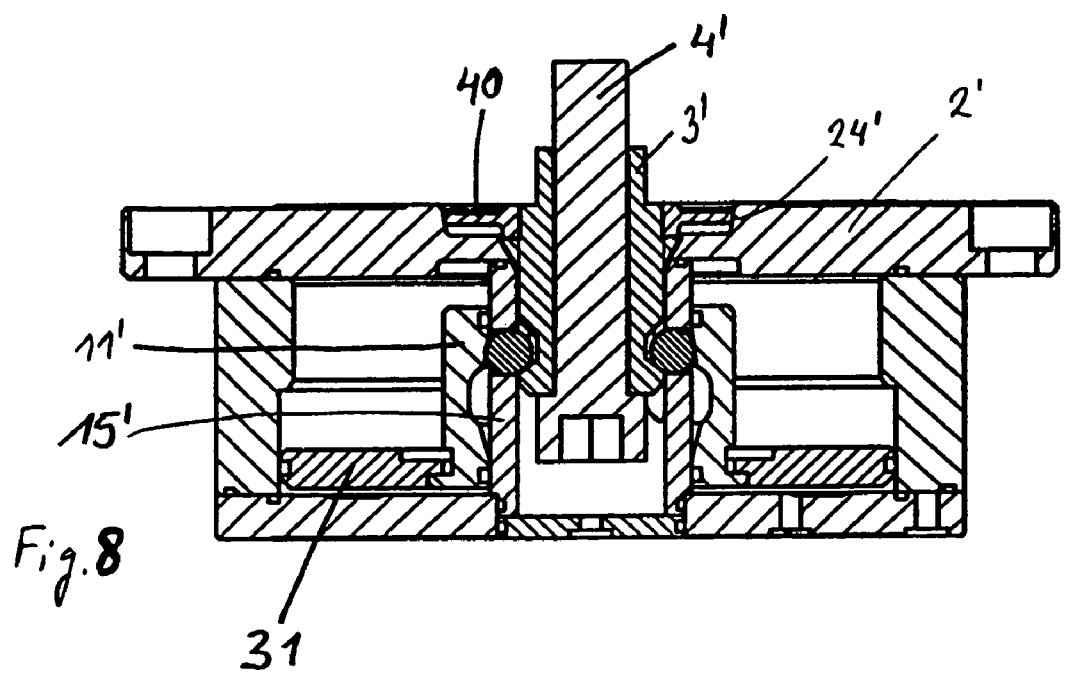
FIG. 8 shows a section through the device in FIG. 4.

A second exemplary embodiment of the device 1 according to the invention is shown in FIGS. 6, 7 and 8. In this exemplary embodiment, the resilient region is formed on the clamping pin instead of on the mounting plate. Here, the clamping surface 24' has an outside diameter which is a few microns larger than the inside diameter of the mounting plate in the corresponding region. The same reference numerals have been used for functionally equivalent parts. The ball sleeve 15' in FIG. 7 is of simpler design compared with the ball sleeve 15 in FIG. 3. Compared with the piston 11 in FIG. 3, the piston 11', 31 is of two-piece design.

Figure 9:
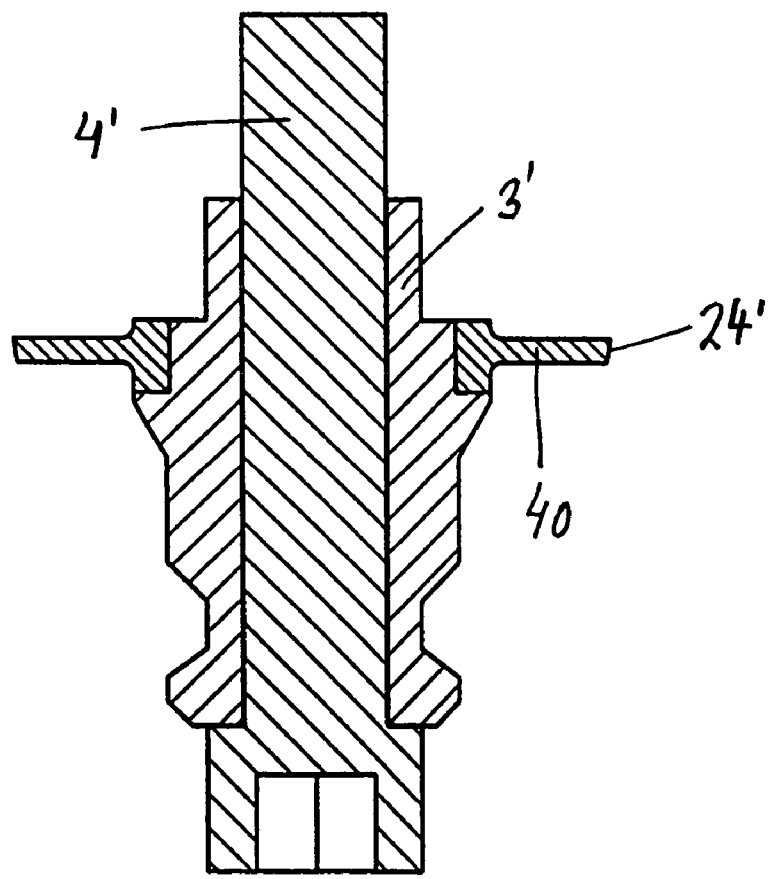
FIG. 9 shows a further, greatly enlarged section through the clamping pin from the device in FIG. 7.

In FIG. 9, the clamping pin 3' from the second exemplary embodiment is shown sectioned without the mounting plate 2'. It can be seen here how a clamping ring 40 having a clamping surface 24' is formed on the clamping pin 3'. The clamping ring 40 is made of a material which has better flexibility than the rest of the clamping pin 3' and ensures a better spring effect.

The backlash-free clamping system proposed here is used in particular in order to be able to clamp workpieces in position on machine tools in a repeatable manner with high precision, in which case high forces and considerable vibrations act on the workpiece during the machining, for example in high-speed precision milling machines.

What is claimed is:

1. A device for holding workpieces or pallets for workpieces in a releasable manner on a machining apparatus, comprising a mounting plate symmetrical about a clamping axis z which can be connected to the machining apparatus for machining the workpiece, and a clamping pin which can be connected to the pallet or to the workpiece and can be held in the mounting plate in a releasable manner, at least one spring for producing a clamping force for fastening the clamping pin to the mounting plate being provided, and a piston which can be moved hydraulically or pneumatically against the clamping force being provided, and a ball sleeve integral with the mounting plate and having balls which can be moved into the ball sleeve by the piston and are arranged so as to interact with the clamping pin in such a way that the clamping pin can be released against the clamping force, wherein a centring region which interacts with the clamping pin and is formed in one piece and in an annular-disc shape form on the mounting plate, and the balls are moveable radially between the piston and the clamping pin and held against axial movement in the ball sleeve relative to the mounting plate.

2. The device for holding workpieces in a releasable manner according to claim 1, wherein the mounting plate, in the centring region, and the clamping pin have clamping surfaces which interact with one another for the centring, run parallel to one another and are each designed as lateral surfaces of a frustum of a cone, the cone apex of which lies inside the device.

3. The device for holding workpieces in a releasable manner according to claim 2, wherein, in the relieved state, the tapering clamping surface in the centring region of the mounting plate is arranged closer to the z-axis of the device than the tapering clamping surface on the clamping pin.

4. The device for holding workpieces in a releasable maimer according to claim 2, wherein the tapering clamping surfaces are arranged so as to interact with one another to form, in the relieved state, an annular passage for a cleaning or flushing medium.

5. The device for holding workpieces in a releasable manner according to claim 2, wherein, to radially move the balls between the piston and the clamping pin, control flanks are formed on the piston and on the clamping pin, these control flanks having a different angle of inclination with respect to the clamping axis (z) in such a way that a reduction ratio of the movement of at least 3 to 1 is achieved and in particular in such a way that the clamping pin can be mechanically locked with the mounting plate in such a way that, in the clamped state of the device, the clamping pin and the mounting plate can be released only by destruction.

6. The device for holding workpieces in a releasable manner according to claim 1, wherein the mounting plate has at least two z-workrest regions of different configurations with feed openings for the flushing or cleaning medium in such a way that the z-workrest regions are cleaned by the flow of the flushing or cleaning medium during the clamping operation, and wherein the presence of a workpiece adjacent to the z-workrest regions of the device is determined by the flow of the medium.

7. A device for holding workpieces or pallets for workpieces in a releasable manner on a machining apparatus, comprising a mounting plate which can be connected to the machining apparatus for machining the workpiece, and a clamping pin which can be connected to the pallet or to the workpiece and can be held in the mounting plate in a releasable manner, at least one spring for producing a clamping force for fastening the clamping pin to the mounting plate being provided, and a piston which can be moved hydraulically or pneumatically against the clamping force being provided, and a ball sleeve having balls which can be moved into the ball sleeve by the piston and are arranged so as to interact with the clamping pin in such a way that the clamping pin can be released against the clamping force, wherein a centring region which interacts with the clamping pin and is formed in one piece and in an annular-disc shape is formed on the mounting plate, wherein the mounting plate, in the centring region, and the clamping pin have clamping surfaces which interact with one another for the centring, run parallel to one another and are formed as lateral surfaces of a frustum of a cone, the cone apex of which lies inside the device.

8. A device for holding workpieces or pallets for workpieces in a releasable manner on a machining apparatus, comprising a mounting plate which can be connected to the machining apparatus for machining the workpiece, and a clamping pin which can be connected to the pallet or to the workpiece and can be held in the mounting plate in a releasable manner, at least one spring for producing a clamping force for fastening the clamping pin to the mounting plate being provided, and a piston which can be moved hydraulically or pneumatically against the clamping force being provided, and a ball sleeve having balls which can be moved into the ball sleeve by the piston and are arranged so as to interact with the clamping pin in such a way that the clamping pin can be released against the clamping force, wherein a centring region which interacts with the clamping pin and is formed in one piece and in an annular-disc shape is formed on the mounting plate, wherein, to radially move the balls between the piston and the clamping pin, control flanks are formed on the piston and on the clamping pin, these control flanks having a different angle of inclination with respect to the clamping axis (z) in such a way that a reduction ratio of the movement of at least 3 to 1 is achieved and in particular in such a way that the clamping pin can be mechanically locked with the mounting plate in such a way that, in the clamped state of the device, the clamping pin and the mounting plate can be released only by destruction.

* * * * *